United States Patent
Takeshima et al.

(10) Patent No.: US 8,382,905 B2
(45) Date of Patent: Feb. 26, 2013

(54) PLANT-FIBER-MATERIAL TRANSFORMATION METHOD

(75) Inventors: Shinichi Takeshima, Numazu (JP);
Akio Koyama, Yokohama (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 12/597,176

(22) PCT Filed: Apr. 25, 2008

(86) PCT No.: PCT/IB2008/001528
§ 371 (c)(1),
(2), (4) Date: Oct. 23, 2009

(87) PCT Pub. No.: WO2008/132605
PCT Pub. Date: Nov. 6, 2008

(65) Prior Publication Data
US 2010/0126501 A1    May 27, 2010

(30) Foreign Application Priority Data
Apr. 25, 2007 (JP) ................. 2007-115407

(51) Int. Cl.
*C13K 1/02* (2006.01)
(52) U.S. Cl. ........................................ 127/37
(58) Field of Classification Search ............... None
See application file for complete search history.

(56) References Cited

U.S. PATENT DOCUMENTS

| | | | |
|---|---|---|---|
| 2,959,500 A | | 11/1960 | Schlapfer et al. |
| 3,652,425 A | * | 3/1972 | Wilson .................... 252/194 |
| 4,237,110 A | * | 12/1980 | Forster et al. ............. 423/488 |
| 4,743,669 A | * | 5/1988 | Young ...................... 527/200 |
| 5,380,341 A | * | 1/1995 | Matthews et al. .......... 29/25.03 |
| 7,947,656 B2 | * | 5/2011 | Yamasaki et al. ............ 514/23 |
| 2010/0189706 A1 | | 7/2010 | Chang et al. |

FOREIGN PATENT DOCUMENTS

| | | |
|---|---|---|
| DE | 713610 | 11/1941 |
| EP | 1 860 201 A1 | 11/2007 |
| JP | 56-30334 | 3/1981 |
| JP | 59124901 A * | 7/1984 |

(Continued)

OTHER PUBLICATIONS

Arai et al, Hydrolysis of cellulose fiber in the presence of 12-tungstosilicic acid, 1985, journal of applied polymer science, vol. 30, pp. 3051-3057.*

(Continued)

*Primary Examiner* — Melvin C Mayes
*Assistant Examiner* — Stefanie Cohen
(74) *Attorney, Agent, or Firm* — Finnegan, Henderson, Farabow, Garrett & Dunner, L.L.P.

(57) ABSTRACT

Cellulose contained in plant fiber material is hydrolyzed with the use of a pseudo-molten cluster acid as a hydrolysis catalyst to produce saccharide, most of which is glucose. After the glucose is produced, the saccharide is precipitated with the use of an organic solvent, and the saccharide including a solidified saccharide during the hydrolysis and the precipitated saccharide is separated from residues and the cluster acid.

26 Claims, 4 Drawing Sheets

FOREIGN PATENT DOCUMENTS

| | | |
|---|---|---|
| JP | 61-118420 | 6/1986 |
| JP | 3-93755 | 4/1991 |
| JP | 4-226940 | 8/1992 |
| JP | 7-41462 | 2/1995 |
| JP | 7-215900 | 8/1995 |
| JP | 8-299000 | 11/1996 |
| JP | 9-176206 | 7/1997 |
| JP | 10-137599 | 5/1998 |
| JP | 10-327900 | 12/1998 |
| JP | 11-240852 | 9/1999 |
| JP | 11-343301 | 12/1999 |
| JP | 2000-103758 | 4/2000 |
| JP | 2002-59118 | 2/2002 |
| JP | 2002-85100 | 3/2002 |
| JP | 2004-241307 | 8/2004 |
| JP | 2004-256370 | 9/2004 |
| JP | 2006-129735 | 5/2006 |
| JP | 3802325 | 5/2006 |
| JP | 2006-149343 | 6/2006 |
| JP | 2006-206579 | 8/2006 |
| JP | 2007-104983 | 4/2007 |
| JP | 2008-271787 | 11/2008 |
| JP | 4240138 | 1/2009 |
| KR | 1996-008643 | 6/1996 |
| WO | WO 95/26438 A1 | 10/1995 |
| WO | WO 2006/011479 | 2/2006 |
| WO | WO 2007/026817 A1 | 3/2007 |
| WO | WO 2008/132605 | 11/2008 |
| WO | WO 2009/031469 A1 | 3/2009 |

OTHER PUBLICATIONS

Tong hao et al, Synthesis and characterization of molybdophosphoric acid, 1991.*

Kozhevnikov, Catalysis by heteropoly acids and multicomponent polyoxometalates in liquid phase reactions, 1998, vol. 98, pp. 171-198.*

Piao et al, An efficient partial oxidation of methane in trifluoroacetic acid using vandaium- containing heteropoly acid catalysts, 1999, journal of organometallic chemistry, vol. 574, pp. 116-120.*

Misono et al, high catalytic activities of pseudoliquid phase of dodecatungstonphosphoric acid for reactions of polar molecues, 1991, chemistry letters, pp. 1695-1698.*

Misono et al, unique acid catalyst of heteropoly compounds (hetropolyoxometalates) in the solid state, 2001, chem. commun. 1141-1152.*

C. Yow et al., "Hydrolysis of Palm Olein Catalyzed by Solid Heteropolyacids," Journal of the American Oil Chemists' Society, vol. 79, No. 4, pp. 357-361 (2002).

Notification of Reason(s) for Refusal dated Jan. 19, 2010 for Japanese Appl. No. JP 2008-145737.

Arai, K. et al., "Hydrolysis of Cellulose Fiber in the Presence of 12-Tungstosilicic Acid," Journal of Applied Polymer Science, 1985, vol. 30, p. 3051-3057 (1985).

Arai, K. et al., "Hydrolysis of Carbohydrates in the Presence of a Heteropolyacid, 1," "Hydrolysis of Sucrose in the Presence of 12-Tungstosilicic Acid," Makromol. Chem., Rapid Commun. 4, 181-185 (1983).

Notification of Transmittal of the International Search Report and The Written Opinion of The International Searching Authority, or the Declaration, for PCT/IB2009/005928, dated Aug. 24, 2009.

Notification of Transmittal of the International Search Report and The Written Opinion of the International Searching Authority, or the Declaration, for PCT/IB2009/005920, dated Aug. 24, 2009.

Notification of Reason(s) for Refusal dated Jan. 19, 2010 for Japanese Appl. No. JP 2008-145741.

G.-W. Wang et al., "Phosphotungstic Acid Catalyzed Amidation of Alcohols," Eur. J. Org. Chem., pp. 4367-4371 (2008).

International Search Report in International Application No. PCT/IB2009/005927, Mailing Date: Aug. 25, 2009.

Written Opinion of the International Searching Authority in International Application No. PCT/IB2009/005927, Mailing Date: Aug. 25, 2009.

Notification of Reason(s) for Refusal in JP 2008-145732; Drafting Date: Jan. 7, 2010.

Takeshima et al., U.S. Appl. No. 12/674,427, filed Feb. 20, 2010.
Takeshima et al., U.S. Appl. No. 12/995,756, filed Dec. 2, 2010.
Takeshima et al., U.S. Appl. No. 12/995,784, filed Dec. 2, 2010.
Takeshima et al., U.S. Appl. No. 12/995,809, filed Dec. 2, 2010.

Decision on Refusal for JP Application No. 2007-115407 dated May 17, 2011.

Notification of Reason(s) for Refusal for JP Application No. 2007-115407 dated Aug. 23, 2011.

Misono, Makoto, "Unique acid catalysis of heteropoly compounds," Chem. Commun., 2001, pp. 1141-1152.

Nishimura, T. et al., "High Catalytic Activities of Pseudoliquid Phase of Dodecatungstophosphoric Acid for Reactions of Polar Molecules," Chemistry Letters, pp. 1695-1698 (1991).

Misono, M. et al., "Solid superacid catalysts," Chemtech, pp. 23-29, Nov. 1993.

Kengaku, T. et al., "Michael addition in the pseudoliquid phase of heteropoly compounds," Journal of Molecular Catalysis A: Chemical 134, pp. 237-242, (1998).

Okuhara, T. et al., "Catalysis by Heteropoly Compounds," Journal of Catalysis 93, pp. 224-230 (1985).

Office Action issued by the U.S. Patent and Trademark in U.S. Appl. No. 12/995,784, mailed Apr. 25, 2012.

* cited by examiner

XO₄: REGULAR TETRAHEDRON(X=P,Si)

US 8,382,905 B2

PLANT-FIBER-MATERIAL TRANSFORMATION METHOD

CROSS-REFERENCE TO RELATED APPLICATIONS

This application is a national phase application of International Application No. PCT/IB2008/001528, filed Apr. 25, 2008, and claims the priority of Japanese Application No. 2007-115407, filed Apr. 25, 2007, the contents of both of which are incorporated herein by reference.

BACKGROUND OF THE INVENTION

1. Field of the Invention

The invention relates to a method of transforming plant fiber material into produce saccharide.

2. Description of the Related Art

Effective use of saccharide as food or fuel has been proposed and is being put into practice, the saccharide being mostly glucose and xylose and produced from cellulose or hemicellulose by transforming plant fiber material, such as squeezed sugarcane residues (bagasse) or wood chips. In particular, biomass energy technology is drawing attention, in which the saccharide obtained by transforming plant fiber material is fermented to produce alcohol, such as ethanol being used as fuel. In Japanese Patent Application Publication No. 8-299000 (JP-A-8-299000), Japanese Patent Application Publication No. 2006-149343 (JP-A-2006-149343), Japanese Patent Application Publication No. 2006-129735 (JP-A-2006-129735), and Japanese Patent Application Publication No. 2002-59118 (JP-A-2002-59118), for example, various methods of producing saccharide, such as glucose, by transforming cellulose or hemicellulose, are proposed. JP-A-8-299000 describes a method of hydrolyzing cellulose with the use of hydrochloric acid or sulfuric acid such as dilute sulfuric acid or concentrated sulfuric acid. A method in which cellulase is used (JP-A-2006-149343), a method in which a solid catalyst, such as activated carbon or zeolite, is used (JP-A-2006-129735), and a method in which pressurized hot water is used (JP-A-2002-59118) are also available.

In the case of the method in which cellulose is transformed with the use of acid, such as sulfuric acid, however, it is difficult to separate the acid and saccharide. This is because acid and glucose, which is the main ingredient of the transformation product, are both soluble in water. Removal of acid by neutralization or ion exchange is not only troublesome and costly, but it is also difficult to completely remove acid because acid may remain in the process of fermentation for ethanol. As a result, even when pH is optimized in view of activity of yeast in the process of fermentation for ethanol, concentration of salt becomes high, which results in reduction in activity of yeast, which in turn results in reduction in fermentation efficiency.

In particular, when concentrated sulfuric acid is used, it is very difficult and very energy consuming to remove sulfuric acid to the extent that yeast is not deactivated. On the other hand, when dilute sulfuric acid is used, it is relatively easy to remove sulfuric acid. However, it is necessary to transform cellulose under high temperature conditions, which is energy consuming. In addition, the acid, such as sulfuric acid and hydrochloric acid is very difficult to separate, collect and reuse. Thus, use of these acids as a catalyst for producing glucose is a cause of increasing the costs of bio-ethanol.

In the case of the method in which pressurized hot water is used, it is difficult to adjust the conditions, and it is therefore difficult to produce glucose with stable yield. In addition, according to the above method, even glucose is transformed to cause reduction in the yield of glucose, and moreover, the activity of yeast is reduced due to the transformation product, which may result in suppression of fermentation. Furthermore, the reactor (supercritical processing apparatus) is expensive and is low in durability, and therefore, this method is problematic also in view of costs.

Meanwhile, widely used catalysts include a cluster acid catalyst, such as heteropoly acid. In Japanese Patent Application Publication No. 2006-206579 (JP-A-2006-206579), for example, a method of manufacturing ester levulinate is described, which carbohydrate and alcohol are reacted under the presence of heteropoly acid. In a method described in WO95/26438, a cluster acid catalyst, in the form of aqueous solution of 0.001 to 0.20 M, is used in the process of removal of lignin from wood pulp and the process of bleaching the wood pulp.

SUMMARY OF THE INVENTION

The invention provides a plant-fiber-material transformation method in which a catalyst for promoting hydrolysis of cellulose or hemicellulose, and saccharide that is obtained by hydrolyzing the cellulose or the like are easily separated, and the separated catalyst is reused. In addition, the invention provides a plant-fiber-material transformation method that is excellent in energy efficiency.

A plant-fiber-material transformation method according to a first aspect of the invention includes: hydrolyzing cellulose contained in plant fiber material with the use of a pseudo-molten cluster acid as a catalyst; and producing saccharide, most of which is glucose.

In the first aspect of the invention, the cluster acid used as the catalyst for hydrolyzing cellulose has acidity stronger than sulfuric acid in general and therefore exhibits sufficient catalytic activity even under low temperature conditions, so that it is possible to obtain saccharide, such as glucose, from cellulose with high-energy efficiency. Moreover, because the pseudo-molten cluster acid also functions as reaction solvent, it is also possible to significantly reduce the amount of solvent used as reaction solvent, as compared to the hydrolysis processes in which other catalysts are used. As a result, it is made possible to separate and collect the cluster acid more efficiently and using less energy.

The hydrolysis step may be performed at or below 140° C. under a pressure condition of an atmospheric pressure to 1 MPa.

The hydrolysis of the cellulose may be performed at or below 120° C.

The hydrolysis of the cellulose may be performed at or below 100° C.

The ratio between the plant fiber material and the cluster acid may be within a range of 1:1 to 1:4.

When the cluster acid is brought into a pseudo-molten state, the cluster acid exhibits the activity as a catalyst for hydrolysis of cellulose or hemicellulose. Because the pseudo-molten state of the cluster acid varies depending on temperature and the amount of water of crystallization contained in the cluster acid, and it is necessary to control the amount of water of crystallization in the cluster acid and reaction temperature when the cluster acid is brought into a pseudo-molten state. Meanwhile, water is needed to hydrolyze cellulose that is a polymer, in which glucose molecules are joined by β-1,4-glycosidic bonds, into saccharide, such as glucose or xylose.

In view of this fact, an amount of water in a hydrolysis reaction system may be equal to or greater than a sum of i) an amount of water of crystallization required to bring all the cluster acid in the hydrolysis reaction system into a pseudo-molten state at a temperature condition for the hydrolysis, and ii) an amount of water required to hydrolyze all the cellulose in the hydrolysis reaction system into glucose.

The cluster acid may be heteropoly acid.

The heteropoly acid may be one selected from a group consisting of phosphotungstic acid, silicotungstic acid, and phosphomolybdic acid.

The heteropoly acid may have a Keggin structure.

The heteropoly acid may have a Dawson structure.

The plant-fiber-material transformation method may further include a separation step after producing the glucose, in which the saccharide is precipitated with the use of an organic solvent, and the saccharide containing a solidified saccharide during the hydrolysis and the precipitated saccharide is separated from residues and the cluster acid.

When cluster acid is used as the catalyst for hydrolyzing cellulose, and organic solvent is used that is a good solvent for the cluster acid but a poor solvent for saccharide, most of which is glucose, that is the product, it is possible to precipitate saccharide and easily separate the cluster acid and the saccharide.

A solubility of the saccharide with respect to the organic solvent may be equal to or less than 0.6 g/100 ml.

The solubility of the saccharide with respect to the organic solvent may be equal to or less than 0.06 g/100 ml.

A solubility of the cluster acid with respect to the organic solvent may be equal to or greater than 20 g/100 ml.

The solubility of the cluster acid with respect to the organic solvent may be equal to or greater than 40 g/100 ml.

At least one selected from ether solvents and alcohol solvents may be used as the organic solvent.

The organic solvent may be ethanol.

The organic solvent may be diethyl ether.

In the separating step, the amount of water in a reaction system in which the separating step is performed may be controlled so that all the cluster acid in the reaction system in which the separating of the saccharide is performed contains water of crystallization whose amount is equal to or less than a normal water-of-crystallization amount. When the cluster acid contains water of crystallization whose amount is greater than the normal water-of-crystallization amount in the separating step, the water molecules that are not coordinated to the cluster acid are mixed into the organic solvent, and the saccharide is dissolved in the mixed water, which causes the saccharide to be mixed into the organic solvent phase in which the cluster acid is dissolved. By controlling the amount of water of crystallization in the cluster acid in the separating step as described above, it is possible to minimize the dissolution of saccharide in the water mixed into the organic solvent phase as described above, and it is therefore possible to improve the yield of saccharide.

When saccharide is transferred to the organic solvent phase, the cluster acid may be dehydrated after the separating step so that all the cluster acid in the organic solvent contains water of crystallization whose amount is equal to or less than the normal water-of-crystallization amount. By dehydrating the cluster acid in the organic solvent to reduce the amount of water of crystallization, it is possible to precipitate and collect the saccharide dissolved in the water that is not coordinated to the cluster acid and mixed into the organic solvent phase.

A cluster acid containing water of crystallization whose amount is equal to or less than the normal water-of-crystallization amount may be used as a desiccant agent to dehydrate the cluster acid.

A content rate of water of crystallization of the cluster acid as the desiccant agent is equal to or less than 70%.

The content rate of water of crystallization of the cluster acid as the desiccant agent is equal to or less than 30%.

The cluster acid dissolved in the organic solvent may be separated from the organic solvent. The separated cluster acid may be reused as the catalyst for hydrolysis of cellulose or hemicellulose contained in plant fiber material.

The plant fiber material may be cellulose-based biomass.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the invention that relates to a method of transforming plant fiber material will be described below with reference to drawings.

The present inventors have found that pseudo-molten cluster acid acts as a catalyst for hydrolyzing cellulose or hemicellulose to produce saccharide, most of which is glucose. The "cluster acid" herein means an acid in which a plurality of oxoacids are condensed, that is, a so-called polyacid. In many cases, the polyacid is in a state where a plurality of oxygen atoms are joined with the center element, which is therefore oxidized to the maximum oxidation number, and the polyacid exhibits excellent characteristics as an oxidation catalyst. In addition, it is known that many polyacids are strong acids. For example, the acidity of phosphotungstic acid (pKa=−13.16), which is a heteropoly acid, is stronger than the acidity of sulfuric acid (pKa=−11.93). Thus, even under mild conditions, such as under a temperature of 50° C., for example, it is possible to transform cellulose or hemicellulose to produce saccharide, such as glucose or xylose.

The cluster acid used in the invention may be either isopoly acid or heteropoly acid. Preferably, the cluster acid is a heteropoly acid because it has a high oxidizing power and a strong acidity. There is no particular limit to the kind of heteropoly acid used. For example, the heteropoly acid may have the general structure [$H_wA_xB_yO_z$], where A represents a heteroatom, such as Phosphorus, Silicon, Germanium, Arsenic or Boron, which can form a heteropoly acid, B represents a polyatom, such as Tungsten, Molybdenum, Vanadium or Niobium, which can form a polyacid, and w, x, y and z denote the content of the components. H, A, B, and O, respectively. The number of kinds of the polyatoms and the heteroatoms that are contained in a single molecule of the heteropoly acid may be one or more.

Specifically, phosphotungstic acid $H_3[PW_{12}O_{40}]$ or silicotungstic acid $H_4[SiW_{12}O_{40}]$, which are tungstates may be used, because of the balanced values of the acidity and the oxidizing power. Alternatively, phosphomolybdic acid $H_3[PMo_{12}O_{40}]$, which is a molybdate, may be used.

Figure 1A:
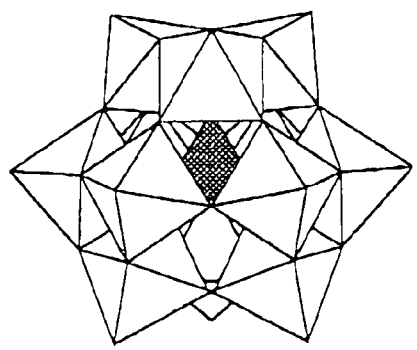
FIG. 1A shows a Keggin structure of heteropoly acid.
Figure 1A:
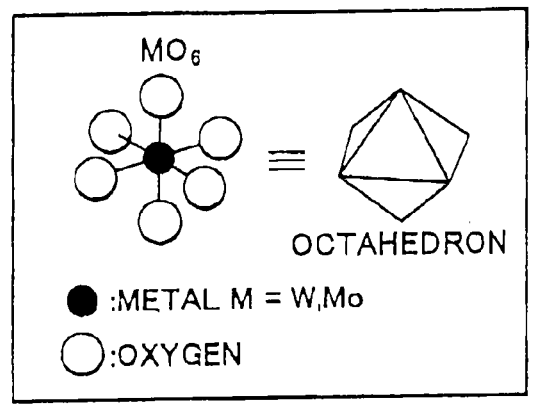
Figure 1B:
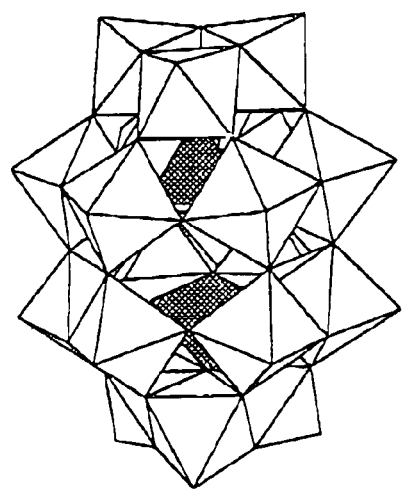
FIG. 1B shows a Dawson structure of heteropoly acid.

The structure of a Keggin-type heteropoly acid $[X^{n+}M_{12}O_{40}$: X=P, Si, Ge, As, etc., M=Mo, W, etc.], phosphotungstic acid, for example, is shown in FIG. 1A. A tetrahedron $XO_4$ is present at the center of polyhedrons, each being an octahedron $MO_6$, and there is a lot of water of crystallization around this structure. It should be noted that there is no particular limit to the structure of the cluster acid. The heteropoly acid may be, for example, a Dawson-type heteropoly acid as shown in FIG. 1B. Although the cluster acid catalyst is not crystalline in nature, the term "water of crystallization," is used herein to refer to the water coordinated to the cluster acid catalyst in a certain ratio. Although, in general, water of crystallization is the water contained in the cluster acid catalyst when the cluster acid catalyst is crystalline, the water molecules that are coordinated to the cluster acid catalyst when the cluster acid catalyst is in a pseudo-molten state in which each molecule of the cluster acid catalyst is liberated from each other or when the cluster acid catalyst is dissolved in ethanol (more specifically, the cluster acid catalyst is suspended in ethanol in a colloidal state, instead of dissolved therein), are referred to as the water of crystallization The cluster acid catalyst as described above is solid at room temperatures. When the cluster acid catalyst is heated, it is brought into a pseudo-molten state, and exhibits catalytic activity to the hydrolysis of cellulose or hemicellulose. The pseudo-molten state herein means a state, in which the cluster acid is apparently melted but is not completely melted into a liquid state; the pseudo-molten state resembles a colloidal (sol) state in which the cluster acid is dispersed in a solution, and is a state in which the cluster acid shows fluidity. Note that, in this state, the cluster acid has a high viscosity and a high density. Whether the cluster acid is in the pseudo-molten state can be determined by visual inspection, or, in the case of a homogeneous system, by Differential Scanning Calorimeter (DSC), for example.

The cluster acid exhibits a high catalytic activity to the hydrolysis of cellulose at low temperatures due to its strong acidity as described above. Because the diameter of a molecule of the cluster acid is about 2 nm, the cluster acid is easily mixed with plant fiber material, which is the raw material, and therefore efficiently promotes hydrolysis of cellulose. Thus, it is possible to hydrolyze cellulose under mild conditions, which provides high-energy efficiency and low environmental load. In addition, unlike the hydrolysis of cellulose using sulfuric acid, for example, the hydrolysis of cellulose of the present embodiment using a cluster acid as a catalyst achieves high efficiency in separating saccharide and the catalyst and it is therefore possible to easily separate saccharide and the catalyst, so that the amount of the catalyst remaining in saccharide is minimized and the hydrolysis process of this embodiment is advantageous also in view of fermentation.

In addition, because the cluster acid becomes solid depending on temperature, it is possible to separate the cluster acid from saccharide, which is the product. Thus, it is possible to collect and reuse the separated cluster acid. Moreover, because the pseudo-molten cluster acid catalyst functions as a reaction solvent, it is also possible to significantly reduce the amount of solvent used as a reaction solvent, as compared to other hydrolysis processes. This means that it is possible to achieve high efficiency in separating the cluster acid and saccharide, which is the product, and in collecting the cluster acid. Specifically, the invention using a cluster acid as a catalyst for hydrolyzing cellulose reduces costs and at the same time is environment-friendly.

A step of hydrolyzing cellulose used in a plant-fiber-material transformation method of the invention will be described in detail below. Although the step in which glucose is produced from cellulose is mainly described in this specification, the plant fiber material includes hemicellulose in addition to cellulose, products include xylose in addition to glucose, and these cases also fall within the scope of the invention. The plant fiber material is not particularly limited as long as containing cellulose or hemicellulose, and includes cellulose-based biomass, such as broad-leaved trees, bamboos, coniferous trees, kenaf, scrap wood from furniture, rice straws, wheat straws, rice husks, and squeezed sugarcane residues (bagasse). The plant fiber material may be the cellulose or hemicellulose that is separated from the above-listed biomass, or may be the cellulose or hemicellulose that is artificially synthesized.

With regard to such fiber material, in general, pulverized material is used in view of the dispersion characteristics in the reaction system. The method of pulverizing the fiber material may be a commonly used method. In view of improvement of the ease of mixing with the cluster acid catalyst and increase in reaction chance, the plant fiber material may be reduced to powder whose diameter is about a few microns to 200 microns.

The cluster acid catalyst and the plant fiber material may be mixed and stirred prior to heating. As described above, in a step of hydrolysis, the cluster acid catalyst is brought into a pseudo-molten state and functions as reaction solvent. Thus, in this embodiment, although it depends on the form of plant fiber material (the size, the state of fiber, for example), and the mixing ratio and the volume ratio between the cluster acid catalyst and the plant fiber material, for example, there is no need to use water, organic solvents, etc. as a reaction solvent. For this reason, when it is intended to ensure contact between the cluster acid and the plant fiber material, the cluster acid catalyst and the plant fiber material may be mixed to some extent before the cluster acid catalyst is brought into a pseudo-molten state.

Figure 2:
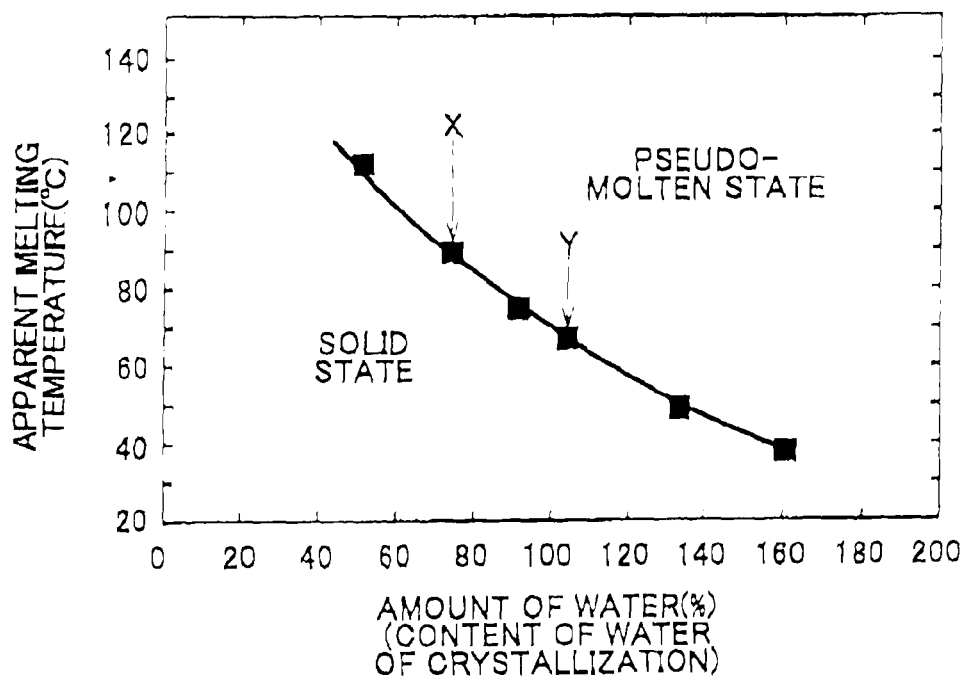
FIG. 2 is a graph showing a relation between the content of water of crystallization in a cluster acid catalyst and apparent melting temperature.

The pseudo-molten state of the cluster acid varies depending on temperature and the amount of water of crystallization contained in the cluster acid catalyst (see FIG. 2). Specifically, the inventors have found that, when the amount of water of crystallization contained increases, the temperature decreases at which the phosphotungstic acid, which is a cluster acid, is brought into a pseudo-molten state. That is, the cluster acid catalyst containing a relatively large amount of water of crystallization exhibits catalytic action to the hydrolysis of cellulose at a temperature lower than that in the case of the cluster acid catalyst that contains a smaller amount of water of crystallization.

FIG. 2 shows a relation between the content of water of crystallization in the heteropoly acid (phosphotungstic acid), which is a typical cluster acid catalyst, and the temperature (apparent melting temperature) at which the pseudo-molten state is brought about. In FIG. 2, the cluster acid catalyst is in a solid state in the region under the curve, and in a pseudo-molten state in the region above the curve. In addition, in FIG. 2, the amount of water (content of water of crystallization) (%) is determined on the assumption that the content of water is 100% when the amount of water of crystallization is equal to the normal water-of-crystallization amount n (n=30) in the cluster acid (phosphotungstic acid). Because no component of cluster acid catalyst is thermally decomposed and volatilized even at a high temperature of 800° C., for example, it is possible to determine the amount of water of crystallization by pyrolytic methods, such as the thermogravimetry (TG) method.

The normal water-of-crystallization amount is the amount (the number of molecules) of water of crystallization contained in a molecule of the cluster acid in a solid crystalline state at room temperatures, and varies depending on the kind of cluster acid. For example, the normal water-of-crystallization amount is about 30 in the case of phosphotungstic acid ($H_3[PW_{12}O_{40}] \cdot nH_2O$ ($n \approx 30$)), about 24 in the case of silicotungstic acid ($H_4[SiW_{12}O_{40}] \cdot nH_2O$ ($n \approx 24$)), and about 30 in the case of phosphomolybdic acid ($H_3[PMo_{12}O_{40}] \cdot nH_2O$ ($n \approx 30$)).

By controlling the amount of water of crystallization contained in the cluster acid catalyst in the hydrolysis reaction system based on the relation between the amount of water of crystallization and the apparent melting temperature, it is possible to bring the cluster acid catalyst into a pseudo-molten state at the hydrolysis reaction temperature. For example, when phosphotungstic acid is used as the cluster acid catalyst, it is possible to control the hydrolysis reaction temperature within the range between 40° C. and 110° C. by changing the amount of water of crystallization in the cluster acid (see FIG. 2).

The amount of water of crystallization contained in the cluster acid catalyst can be regulated by controlling the amount of water present in the hydrolysis reaction system. Specifically, when it is desired to increase the amount of water of crystallization contained in the cluster acid catalyst, that is, to lower the reaction temperature, a measure that can be taken is to add water to the hydrolysis reaction system by adding water to the mixture containing the plant fiber material and the cluster acid catalyst, or raising the relative humidity of the atmosphere surrounding the reaction, system, for example. As a result, the cluster acid takes in the added water as water of crystallization, and the apparent melting temperature of the cluster acid catalyst is lowered.

On the other hand, when it is desired to reduce the amount of water of crystallization contained in the cluster acid catalyst, a measure that can be taken is to reduce the water of crystallization contained in the cluster acid catalyst by removing water from the hydrolysis reaction system by, for example, heating the reaction system to evaporate water, or adding a desiccant agent to the mixture containing the plant fiber material and the cluster acid catalyst. As a result, the apparent melting temperature of the cluster acid catalyst is raised. As described above, it is possible to easily control the amount of water of crystallization contained in the cluster acid, and it is also possible to easily regulate the reaction temperature at which cellulose is hydrolyzed, by controlling the amount of water of crystallization.

Figure 3:
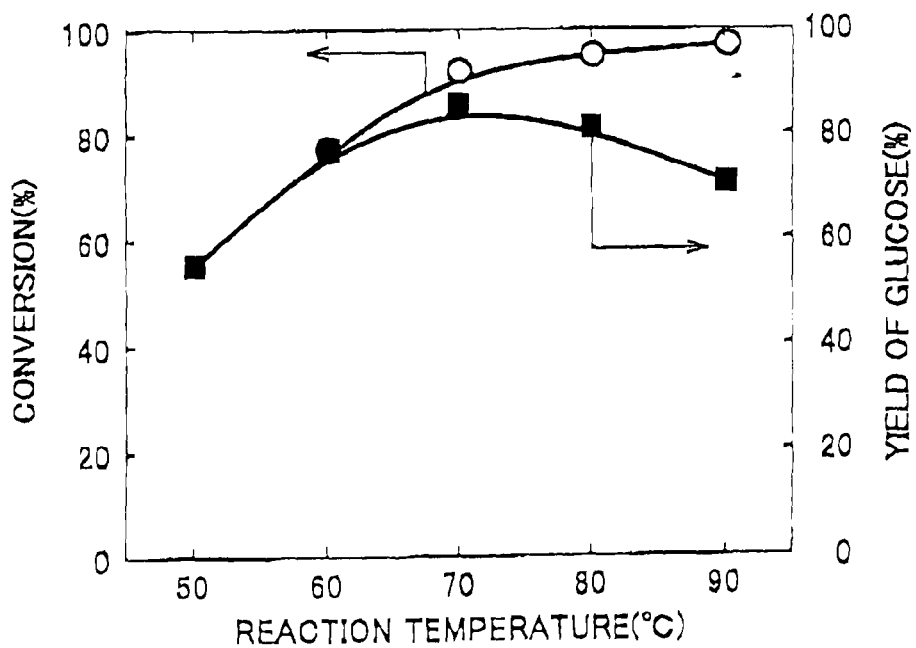
FIG. 3 is a graph showing a relation among conversion R of cellulose, yield η of glucose, and hydrolysis reaction temperature.

Lowering the reaction temperature in the hydrolysis step is advantageous in that it is possible to improve energy efficiency. In addition, the present inventors have found that the selectivity with which the glucose is produced by hydrolysis of cellulose contained in the plant fiber material varies depending on the hydrolysis reaction temperature (see FIG. 3). As shown in FIG. 3, it is a common fact that the higher the reaction temperature is, the higher the conversion is; in the hydrolysis of cellulose using the phosphotungstic acid of which the content of water of crystallization is 160% (the apparent melting temperature is about 40° C.; see FIG. 2), the conversion R in the temperature range between 50° C. to 90° C. increases as the temperature increases, and almost all the cellulose reacts at about 80° C.

On the other hand, although the yield $\eta$ of glucose increases from 50° C. to 60° C. as in the case of the conversion of cellulose, the yield readies the peak at 70° C. and decreases with temperature. Specifically, glucose is produced with high selectivity between 50° C. to 60° C., whereas, between 70° C. and 90° C., reactions, other than the glucose producing reaction, proceed that include formation of other saccharides, such as xylose, and transformation, for example. It should be noted that the conversion R of cellulose and the yield $\eta$ of glucose can be calculated using the following expressions.

$$R = \{(QCt - QCr)/QCt\} \times 100$$

$$\eta = R \times (QG/QGt)$$

where QCt is the amount of prepared cellulose; QCr is the amount of unreacted cellulose; QG is the amount of glucose produced when all the prepared cellulose is hydrolyzed; and QGt is the actual amount of collected cellulose.

As described above, the hydrolysis reaction temperature is an important factor that influences the conversion of cellulose and the selectivity for the production of glucose. Although it is preferable that the hydrolysis reaction temperature be low in view of energy efficiency, the hydrolysis reaction temperature may be determined in consideration of the conversion of cellulose, the selectivity for the production of glucose, etc. in this way. It should be noted that the selectivity for the production of the saccharide produced by hydrolysis of cellulose can show a behavior different from that as shown in FIG. 3, depending on the reaction conditions etc.

As described above, it is possible to control the system so that the cluster acid catalyst is brought into a pseudo-molten state at a desired hydrolysis reaction temperature, by adding or removing water to or from the hydrolysis reaction system by the method as described above as needed.

In the hydrolysis step, however, one molecule of water per molecule of glucose is needed when cellulose is hydrolyzed. Thus, in the case where the amount of water present in the reaction system is less than the sum of the amount of water corresponding to the amount of water of crystallization required to bring the cluster acid catalyst into a pseudo-molten state at the reaction temperature and the amount of water required to hydrolyze all the provided cellulose into glucose, when the water of crystallization contained in the cluster acid catalyst is used in hydrolysis of cellulose, the water of crystallization contained in the cluster acid catalyst decreases, and the cluster acid is therefore brought into a solid state. Accordingly, the catalytic action of the cluster acid catalyst to the hydrolysis of cellulose is impaired, and in addition, viscosity of the mixture of the plant fiber material and the cluster acid catalyst increases, which can result in insufficient mixing of the mixture.

When it is intended to maintain the catalyst activity and the function as reaction solvent of the cluster acid catalyst at the reaction temperature in a hydrolysis step (that is, to maintain the cluster acid catalyst in a pseudo-molten state in the hydrolysis step), the amount of water in the reaction system is set as described below. Specifically, the amount of water in the reaction system is set equal to or greater than the sum of the amount of water of crystallization required to bring all the cluster acid catalyst present in the reaction system into a pseudo-molten state at the reaction temperature in the hydrolysis step and the amount of water required to hydrolyze all the cellulose present in the reaction system into glucose.

The water of crystallization required to bring all the cluster acid catalyst into a pseudo-molten state, herein, indicates the case where a portion of water molecules are present outside the crystal lattice as well as the case where the water of crystallization required to bring all the cluster acid catalyst into a pseudo-molten state at the hydrolysis temperature is present inside the crystal lattice. Although it is possible to determine the lower limit of the amount of water present in the reaction system in the hydrolysis step based on the above point, it is difficult to determine the upper limit thereof because the upper limit varies depending on the various conditions of the hydrolysis step. Because an excessive amount of water can cause increase in the amount of energy required to maintain the temperature of the reaction system, reduction in the chance of reaction between cellulose and the cluster acid catalyst, etc. with high probability, the smaller the amount of water in the hydrolysis step is, the better.

It should be noted that preparations may be made so that a desired amount of water of crystallization contained in the cluster acid catalyst is retained even when the relative humidity around the reaction system drops by heating. Specifically, a method can be used, for example, in which, in order that the atmosphere surrounding the reaction system reaches water vapor saturation at the predetermined reaction temperature, the inside of a closed reaction container is saturated with water vapor at the hydrolysis reaction temperature, the temperature in the reaction container is then lowered with the container being kept closed to condense the water vapor, and the condensed water is added to the plant fiber material and the cluster acid catalyst. When a wet plant fiber material is used, the amount of water contained in the plant fiber material is taken into consideration as the amount of water present in the reaction system, although there is no need to take this into consideration when a dried plant fiber material used.

In the hydrolysis step, when the amount of water in the reaction system and therefore the amount of water of crystallization contained in the cluster acid catalyst decrease, and therefore the cluster acid catalyst is brought into a solid state and is reduced in catalytic activity, the reduction in catalytic activity of the cluster acid catalyst, for example, may be avoided by raising the hydrolysis reaction temperature so that the cluster acid catalyst is brought into a pseudo-molten state.

The temperature in the hydrolysis step may be appropriately determined in consideration of some factors, such as reaction selectivity, energy efficiency and conversion of cellulose, as described above. In consideration of balancing of energy efficiency, conversion of cellulose and yield of glucose, the temperature may be equal to or below 140° C., in particular, equal to or below 120° C. Depending on the form of the plant fiber material, a low temperature condition, such as 100° C. or below, may be used. In particular, in this case, it is possible to produce glucose with high-energy efficiency.

There is no particular limit to pressure in the hydrolysis step. Because catalytic activity of the cluster acid catalyst to the hydrolysis of cellulose is high, it is possible to cause hydrolysis of cellulose to proceed efficiently even under mild pressure conditions, such as normal (atmospheric) pressure to 10 MPa.

The ratio between plant fiber material and a cluster acid catalyst varies depending on the characteristics, such as size, of the used plant fiber material, and the stirring method, the mixing method, etc. used in the hydrolysis step, for example. Thus, the ratio may be appropriately determined in consideration of the practical conditions. For example, the ratio (weight ratio), (cluster acid catalyst):(plant fiber material), may be within the range of 1:1 to 4:1, typically 1:1.

There is no particular limit to the duration of the hydrolysis step. The duration may be appropriately set in consideration of the form of the used plant fiber material, the ratio between the plant fiber material and the cluster acid catalyst, the catalytic performance of the cluster acid catalyst, reaction temperature, reaction pressure, etc. In the hydrolysis step, viscosity of the mixture containing the cluster acid catalyst and the plant fiber material is high, and an advantageous stirring method is therefore one in which a heated ball mill is used, for example. However, a common stirrer may be used.

Next, a second embodiment of the invention that relates to a method of separating the saccharide, most of which is glucose, produced in the hydrolysis step and the cluster acid catalyst will be described. Specifically, a method will be described in which a plant fiber material containing cellulose or hemicellulose is hydrolyzed using a cluster acid catalyst to produce saccharide, most of which is glucose, and the obtained saccharide and the cluster acid catalyst are then separated.

Because the cluster acid catalyst and the produced saccharide are both water-soluble, when a sufficient amount of water is present, the resultant mixture obtained after the hydrolysis step is obtained in a state where the residue of the plant fiber material (unreacted cellulose etc.) is included as the solid ingredient, whereas the cluster acid catalyst and the saccharide are both dissolved. Part of the saccharide produced by hydrolysis is precipitated as solids.

Studies conducted by the present inventors have revealed that a cluster acid catalyst exhibits solubility in the organic solvent in which the saccharide, most of which is glucose, is hardly dissolved or not dissolved. Thus, it is possible to separate saccharide and a cluster acid catalyst with the use of the organic solvent that is a poor solvent for saccharide and is a good solvent for cluster acid catalysts. For example, saccharide is precipitated by adding a sufficient amount of the above-described organic solvent to the mixture (hereinafter also referred to as the "hydrolysis mixture") of the cluster acid catalyst, saccharide and the residue obtained after the hydrolysis step, to bring the organic solvent and the hydrolysis mixture into contact with each other, whereby the saccharide and the residue of the plant fiber material, including unreacted cellulose, are separated as solids. Meanwhile, the cluster acid catalyst is obtained in the form of an organic solvent solution in which the cluster acid catalyst is dissolved in the organic solvent. Although most of the saccharide produced by the hydrolysis is precipitated in a solid state, part of the saccharide is in a dissolved state. By precipitating the dissolved saccharide with the use of the organic solvent, it is possible to separate the dissolved saccharide along with the saccharide precipitated during the hydrolysis from the mixture, and it is therefore possible to improve the yield of saccharide.

The above-described organic solvent is not particularly limited as long as the organic solvent has dissolving characteristics such that the organic solvent is a good solvent for cluster acid catalysts and a poor solvent for saccharide. In order to efficiently precipitate saccharide, solubility of saccharide in the organic solvent may be equal to or less than 0.6 g/100 ml, or in particular equal to or less than 0.06 g/100 ml. In order to efficiently precipitate saccharide only, solubility of cluster acid in the organic solvent may be equal to or greater than 20 g/100 ml, or in particular equal to or greater than 40 g/100 ml.

Specifically, such organic solvents include alcohol, such as ethanol, methanol or n-propanol, ether, such as diethyl ether or diisopropyl ether, for example. Alcohol and ether can be used, and among others, ethanol and diethyl ether can be used. Diethyl ether is an optimum solvent for separating saccharide and a cluster acid catalyst because saccharide, such as glucose, is insoluble in diethyl ether, and cluster acid is highly soluble in diethyl ether. Meanwhile, ethanol is another optimum solvent because saccharide, such as glucose, is hardly soluble in ethanol, and cluster acid catalysts are highly in ethanol. Diethyl ether is advantageous as compared to ethanol in view of distillation. Ethanol is advantageous in that availability of ethanol is higher than that of diethyl ether.

The amount of usage of the organic solvent varies depending on the dissolving characteristics of the organic solvent with respect to saccharide and cluster acid catalysts, and the amount of water contained in the hydrolysis mixture. Thus, the amount of usage of the organic solvent may be determined appropriately so that it is possible to efficiently precipitate the produced saccharide without waste, that it is possible to efficiently collect cluster acid, and that it is possible to dissolve the cluster acid catalyst contained in part of the saccharide that is solidified, by breaking the solidified saccharide.

Temperature in the separation step may be within the range between room temperature and 60° C., although depending on the boiling point of, the organic solvent. In the separation step, there is no particular limit to the method of bringing the hydrolysis mixture and the organic solvent into contact with each other, more specifically, the method of adding the organic solvent to the hydrolysis mixture and the method of stirring the hydrolysis mixture and the organic solvent, for example; a commonly used method may be used. In view of the efficiency in collecting the cluster acid, a preferable stirring method is one in which stirring and/or breaking are performed using a ball mill or the like.

In addition, the present inventors have found that, when the cluster acid catalyst contains a large amount of water of crystallization (the amount of water of crystallization is greater than the normal water-of-crystallization amount, for example) in the separation step, the excessive water is not coordinated to the cluster acid and mixed into the organic solvent, and saccharide, which is the product, is dissolved in the water mixed into the organic solvent. When water is mixed into the organic solvent in which the cluster acid catalyst is dissolved, and saccharide is dissolved in this water, the yield of saccharide is reduced.

Thus, in order to minimize reduction in the yield of saccharide, the total amount of water of crystallization contained in all the cluster acid catalyst present in the reaction system may be equal to or less than the normal water-of-crystallization amount in the above-described separation step. By the experiments conducted by the inventors, it has been confirmed that saccharide, most of which is glucose, is prevented from being dissolved in the water that is not coordinated to the cluster acid and mixed into the organic solvent when the amount of water of crystallization contained in the cluster acid catalyst present in the reaction system is equal to or less than the normal water-of-crystallization amount (see FIG. 4). "The water of crystallization contained in the cluster acid catalyst present in the reaction system is equal to or less than the normal water-of-crystallization amount" herein means that the amount of water of crystallization contained in the cluster acid catalyst is equal to or less than the normal water-of-crystallization amount when the water present in the reaction system in the separation step is evenly taken in by all the cluster acid catalyst as water of crystallization.

Examples of the method of controlling the amount of water present in the reaction system in the separation step include a method in which the water in the hydrolysis mixture is evaporated by releasing the closed state of the reaction system and heating the reaction system, and a method in which a desiccant agent or the like is added to the hydrolysis mixture to remove the water in the hydrolysis mixture. When the above-described evaporation method is used, it is possible to use the afterheat due to the reaction temperature in the hydrolysis step, which results in excellent energy efficiency, and in addition, the step of separating the desiccant agent, or the like, is not needed.

Thus, in the separation step, the smaller the amount of water of crystallization contained in the cluster acid catalyst is, the better, and the optimum water-of-crystallization amount can differ from that in the hydrolysis step that requires hydrolysis reaction temperature, conversion, selectivity for a product, etc. to be taken into consideration. Accordingly, the amount of water of crystallization contained in the cluster acid catalyst may be regulated prior to the hydrolysis step in consideration of the efficiency in separating saccharide and a cluster acid catalyst in the separation step, or the amount of water of crystallization contained in the cluster acid catalyst may be controlled as needed between the hydrolysis step and the separation step as described above.

In the separation step, a precipitate of saccharide is obtained as solids along with the residue of the plant fiber material etc., and at the same time, an organic solvent solution in which a cluster acid catalyst is dissolved is obtained. This is separated into solids and an organic solvent solution by a certain method, such as filtering. Solids containing saccharide can be further separated into an aqueous solution of saccharide and solids such as residues by adding water; in which solubility of saccharide in water and insolubility of the residues in water are used. On the other hand, the organic solvent solution containing the cluster acid catalyst can be separated into the cluster acid catalyst and organic solvent by a commonly used separation method, such as evaporation. Thus, the cluster acid catalyst can be separated from the product, the residues, etc. and collected after being used as the catalyst for hydrolyzing cellulose, and in addition, if is also possible to reuse the cluster acid catalyst as the catalyst for hydrolyzing plant fiber material containing cellulose.

Assume that, in the separation step, an excessive amount of water of crystallization contained in the cluster acid catalyst is mixed into the organic solvent, saccharide is dissolved in the water, and the saccharide is transferred to the organic solvent phase along with the cluster acid catalyst. In this case, it is possible to precipitate the saccharide in the organic solvent solution by reducing the amount of water in the organic solvent solution of cluster acid in which the cluster acid catalyst is dissolved. Specifically, the cluster acid catalyst may be dehydrated so that all the cluster acid catalyst dissolved in the organic solvent solution contains water of crystallization whose amount is equal to or less than the normal water-of-crystallization amount. This is because it is possible to prevent the saccharide, most of which is glucose, from being dissolved in the water, which includes the water molecules that cannot be coordinated to the cluster acid catalyst, mixed into the organic solvent when the amount of water of crystallization contained in the cluster acid catalyst is equal to or less than the normal water-of-crystallization amount as described above.

There is no particular limit to the method of dehydrating the cluster acid catalyst contained in an organic solvent solution, and examples thereof include a method in which an appropriate amount of desiccant agent, such as anhydrous calcium chloride or silica gel, is added to the organic solvent solution. When such a desiccant agent is used, however, another step of removing the desiccant agent is required.

As another example, there is a method in which the cluster acid catalyst whose content rate of water of crystallization ((the amount of water of crystallization)/(the normal water-of-crystallization amount)×100%) is equal to or less than 70%, in particular, equal to or less than 30%, is used as the desiccant agent. It is possible to reduce the amount of water of crystallization contained in the cluster acid catalyst below the normal water-of-crystallization amount by adding the dry-state cluster acid catalyst to increase the amount of the cluster acid catalyst contained in the organic solvent solution. In addition, the cluster acid catalyst used as the desiccant agent can be separated and collected along with the cluster acid catalyst used as the hydrolysis catalyst. The saccharide in the organic solvent solution that is precipitated by dehydration can be separated from the organic solvent solution and collected by a commonly used method, such as decantation or filtering.

A method using the difference between a cluster acid catalyst and saccharide in their solubilities in solvents has been mainly described as an example of the method of separating a cluster acid catalyst and saccharide. However, because there is a difference between molecule sizes (heteropoly acid, which is a representative example of cluster acid catalysts, has a diameter of about 2 nm, and glucose has a diameter of about 0.7 nm), it is also possible to use the molecular sieving effects of porous material, such as MFI zeolite and β zeolite, which have ten-membered oxygen rings, and mordenite, which has twelve-membered oxygen rings.

In the experiments described below, measurement of D-(+)-glucose and D-(−)-glucose was conducted by the post-label fluorescent detection method using high-performance liquid chromatography (HPCL).

An experiment concerning the relation between the apparent melting temperature and the content of water of crystallization in cluster acid (heteropoly acid) will be described. The apparent melting temperatures of phosphotungstic acids ($H_3[PW_{12}O_{40}]\cdot nH_2O$), which have different contents of water of crystallization, were visually studied while heating. The results are shown in FIG. 2. The content of water of crystallization in phosphotungstic acid was regulated by drying X (the content rate of water of crystallization is 75%) and Y (the content rate of water of crystallization is 100%) by heating these materials, or by dropping water thereon. The content rate of water of crystallization is assumed to be 100% when the number of molecules of water of crystallization is 30 (n=30). As shown in FIG. 2, it has been found that the higher the content of water of crystallization in heteropoly acid is, the lower the apparent melting temperature (pseudo-melting temperature) of the heteropoly acid is.

Example 1

As described below, the conversion of cellulose and the selectivity for the production of glucose were measured at some hydrolysis reaction temperatures (temperatures of pseudo-molten material: 50° C., 60° C., 70° C., 80° C., 90° C.). First, 1 kg of phosphotungstic acid (the content rate of water of crystallization was 160%; the diameter was about 2 nm) and 0.5 kg (dry weight) of cellulose were mixed, put in a closed container (located on a hot plate), and heated. The phosphotungstic acid was brought into a pseudo-molten, stirrable state around 40° C. Then, the mixture was heated to the respective temperatures (50° C., 60° C., 70° C., 80° C., 90° C.) and was then stirred and subjected to hydrolysis reaction for three hours.

After the temperature was dropped to room temperature, 3 liters of ethanol was added to the mixture, in the closed container, of phosphotungstic acid that was brought from the pseudo-molten state to a solid state, saccharide, most of which was glucose, that was produced by hydrolysis of cellulose, and fiber (including transformed material), such as lignin, and the mixture was then stirred for 30 minutes. Although the phosphotungstic acid was dissolved in the added ethanol, the saccharide was not dissolved in the ethanol and obtained as a precipitate along with the fiber.

The precipitated saccharide and fiber were filtered to separate an ethanol solution and a precipitate (saccharide and fiber). Then, 1.5 liters of distilled water was added to the precipitate and stirred for 30 minutes to dissolve saccharide, and the resultant solution was again filtered to separate an aqueous solution of saccharide in which saccharide was dissolved and fiber (unreacted cellulose). On the other hand, the ethanol solution was distilled to separate ethanol and phosphotungstic acid.

The conversion R and the yield η of glucose at respective hydrolysis reaction temperatures are shown in FIG. 3. As can be seen from FIG. 3, the conversion of cellulose increases as the reaction temperature increases. On the other hand, although the yield of glucose increases from 50° C. to 60° C. as in the case of the conversion of cellulose, the yield reaches the peak at 70° C. and decreases with temperature. Thus, it has been found that, under the conditions of this experiment, glucose is produced with high selectivity between 50 and 60° C., whereas reactions, other than glucose producing reaction, proceed between 70 and 90° C. It is conceivable that this result varies depending on the form of the reactor and ways of operation, etc., and it can be said that optimization of the used apparatuses is also important in order to obtain high yield and selectivity.

Example 2

Bagasse was pulverized by a pulverizer into powder whose particle size was about ten-odd microns, and 0.3 kg (dry weight) of this powder and 1 kg of phosphotungstic acid (the content of water of crystallization was unknown; the diameter was about 2 nm) were mixed, put in a closed container, and heated. The phosphotungstic acid was brought into a pseudo-molten, stirrable state around 40° C. The mixture was heated to about 50° C. and then stirred for three hours.

After the temperature was dropped to room temperature, 3 liters of ethanol was added to the mixture A, in the closed container, of phosphotungstic acid that was brought from the pseudo-molten state to a solid state, saccharide, most of which was glucose, that was produced by hydrolysis of cellulose, and fiber (including transformed material), such as lignin, and the mixture A was then stirred for 30 minutes. Although the phosphotungstic acid was dissolved in the added ethanol, the saccharide was not dissolved in the ethanol and obtained as a precipitate along with the fiber.

The precipitated saccharide and the fiber were filtered to separate an ethanol solution and a precipitate (saccharide and fiber). Then, 1 liter of distilled water was added to the precipitate and stirred for 30 minutes to dissolve saccharide, and the resultant solution was again filtered to separate an aqueous solution of saccharide in which saccharide was dissolved and fiber (unreacted cellulose). On the other hand, the ethanol solution was distilled to separate ethanol and phosphotungstic acid. The yield of glucose was 0.20 kg, and that of xylose was 0.06 kg.

Example 3

Wood chips were crushed, subjected to a steam process for two hours, and then pulverized by a pulverizer into powder whose particle size was about ten-odd microns, and 0.3 kg (dry weight) of this powder and about 1 kg of phosphotungstic acid (the content of water of crystallization was unknown) were mixed, put in a closed container, and heated. The phosphotungstic acid was brought into a pseudo-molten, stirrable state around 40° C. The mixture was heated to about 70° C. and then stirred for three hours. Thereafter, in a way similar to that used in Example 2, phosphotungstic acid was collected, and the produced saccharide and the unreacted cellulose were separated. The yield of glucose was 0.21 kg, and that of xylose was 0.07 kg.

Example 4

As in the case of Japanese Patent Application Publication No. 2001-240411 (JP-A-2001-240411), a porous alumina tube with a mordenite membrane formed on the outer side thereof was prepared. A mixture A obtained in a way similar to that used in Example 2 was diluted with 1 liter of distilled water, led into the tube, and held for an hour with a pressure of 2 MPa applied in the tube. While this was performed, the tube was immersed in 1 liter of distilled water.

An hour later, the water in which the tube was immersed was sampled, and subjected to high-performance liquid chromatography (HPLC). As a result, it was confirmed that D-(+)-glucose and D-(+)-xylose were contained in the water. Meanwhile, the liquid in the tube was sampled and analyzed by HPLC. As a result, it was confirmed that the concentration of saccharide had dropped. Until the concentration of saccharide (glucose and xylose) in the liquid in the tube had dropped to one-tenth of the initial concentration, the above process was repeated. Meanwhile, the phosphotungstic acid left in the water in the tube was collected as solid phosphotungstic acid.

Example 5

First, mixtures were prepared in which phosphotungstic acids with various contents of water of crystallization (see FIG. 4) and glucose were mixed in the ratio of 2:1 ((phosphotungstic acid):(glucose) (weight ratio)). For the phosphotungstic acid whose content rate of water of crystallization was equal to or greater than 100%, the content of water of crystallization contained in phosphotungstic acid was regulated by adding an appropriate amount of water to the mixture as needed so that the phosphotungstic acid in the mixture had a desired content of water of crystallization, after mixing the phosphotungstic acid and glucose. On the other hand, for the phosphotungstic acid whose content rate of water of crystallization was less than 100%, phosphotungstic acid was heated and dehydrated in advance. The amount of water contained in the phosphotungstic acid obtained after dehydration was measured by TGA (thermogravimetric analysis). Next, dehydrated ethanol was added to the mixture of phosphotungstic acid and glucose with the weight ratio of ethanol to phosphotungstic acid being 100/30. After the mixture was well stirred and mixed, solids, including precipitated glucose, were separated to obtain an ethanol solution. The amount of glucose in this ethanol solution was analyzed and measured by the post-label fluorescent detection method using HPCL, to calculate a glucose loss that indicates the ratio of the amount of glucose that was left in the ethanol solution and could not be separated. The results are shown in FIG. 4.

Figure 4:
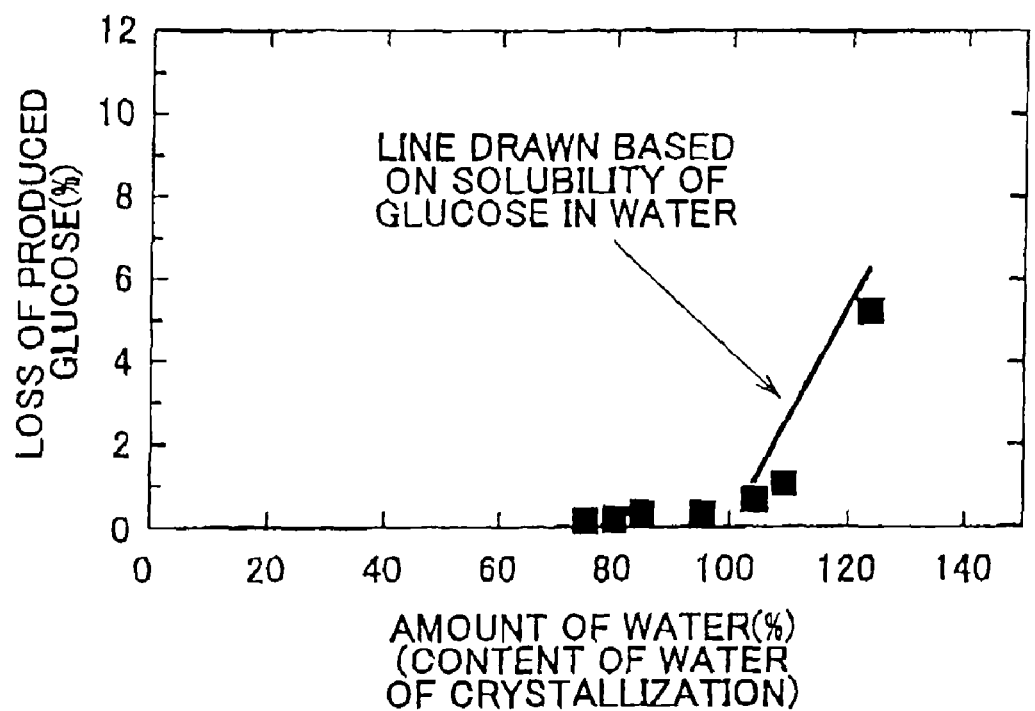
FIG. 4 is a graph showing a relation between the content of water of crystallization and loss of glucose due to dissolution when the cluster acid catalyst is collected.

FIG. 4 shows that when the content rate of water of crystallization contained in phosphotungstic acid is equal to or less than 100%, the glucose loss ratio with respect to the phosphotungstic acid is almost zero. Specifically, by making the amount of water of crystallization contained in the cluster acid catalyst equal to or less than the normal water-of-crystallization amount, it is possible to minimize reduction in the yield of saccharide that is caused by dissolution of saccharide in water that is not coordinated to cluster acid and mixed into organic solvent when cluster acid and saccharide are separated by precipitating saccharide with the use of organic solvent.

Example 6

Distilled water was put in a closed container in advance, and temperature of the distilled water was raised to a predetermined reaction temperature (60° C.) to saturate the inside of the container with water vapor and cause water vapor to attach to the inner side of the container. Next, 1 kg of phosphotungstic acid whose content of water of crystallization had been measured in advance and 0.5 kg (dry weight) of cellulose were mixed and put in the closed container. In addition, distilled water (55.6 g) was added whose amount was equal to the amount by which the water in the reaction system is short of the sum of the amount of water (158 g) that is required to bring phosphotungstic acid into a pseudo-molten state at the reaction temperature of 60° C. and the amount of water (55.6 g) that is required to hydrolyze cellulose into glucose.

When the closed container was then heated, the phosphotungstic acid was brought into a pseudo-molten state from around 40° C., and was brought into a state in which the mixture in the container could be stirred, around 50° C. The mixture was further heated to 60° C., and stirred for 1.5 hours at 60° C. Heating was then stopped and the mixture was cooled to around 40° C. Thereafter, 6 liters of ethanol was added, the mixture was stirred for 60 minutes to dissolve the phosphotungstic acid in the ethanol, and saccharide was precipitated along with fiber (unreacted cellulose).

Next, the precipitate was filtered, 1 liter of distilled water was added to the separated precipitate, and the mixture was stirred for 15 minutes to dissolve saccharide. The mixture was further filtered to separate an aqueous solution of saccharide and fiber. On the other hand, the ethanol solution was distilled to separate ethanol and phosphotungstic acid. The conversion R was 67%, and the yield $\eta$ of glucose was 60%.

Example 7

In a closed container, 1 kg of phosphotungstic acid whose content rate of water of crystallization was 100% shown by Y in FIG. 2 and 0.5 kg (dry weight) of cellulose were mixed, and distilled water (55.6 g) was added so that the water required to hydrolyze 0.5 kg of cellulose into glucose existed. When this mixture was heated, the phosphotungstic acid was brought into a pseudo-molten state around 50° C., and was brought into a state in which the mixture could be stirred, around 60° C. The mixture was further stirred for 1.5 hours with the mixture being maintained at 60° C.

Thereafter, in a way similar to that used in Example 6, phosphotungstic acid was collected, and the produced saccharide and the unreacted cellulose were separated. The conversion R was 68%, and the yield $\eta$ of glucose was 63%.

Example 8

In a closed container, 1 kg of phosphotungstic acid whose content rate of water of crystallization was 75% shown by X in FIG. 2 and 0.5 kg (dry weight) of cellulose were mixed, and distilled water (55.6 g) was added so that the water required to hydrolyze 0.5 kg of cellulose into glucose existed. When this mixture was heated, the phosphotungstic acid was not brought into a pseudo-molten state even when the mixture was heated to 50° C. The mixture was gradually brought into a pseudo-molten state around 80° C., and was brought into a state in which the mixture could be stirred, at 90° C. The mixture was further stirred for 1.5 hours with the mixture being maintained at 90° C.

Thereafter, in a way similar to that used in Example 6, phosphotungstic acid was collected, and the produced saccharide and the unreacted cellulose were separated. The conversion R was 96%, and the yield η of glucose was 72%. The result of calculating the yield of xylose was 7%. Although a very high conversion of 96% was obtained, the loss was 28% in producing glucose that was the desired substance. This result shows that the amount of water of crystallization contained in the phosphotungstic acid used in Example 8 was less than that in the phosphotungstic acid used in Example 7, and it is necessary to set the reaction temperature higher than that of Example 5 in order to bring the phosphotungstic acid into a pseudo-molten state, and shows that for this reason, although the conversion was high, selectivity for the production of glucose through hydrolysis dropped and the amount of other by-products produced increased.

Example 9

Figure 5:
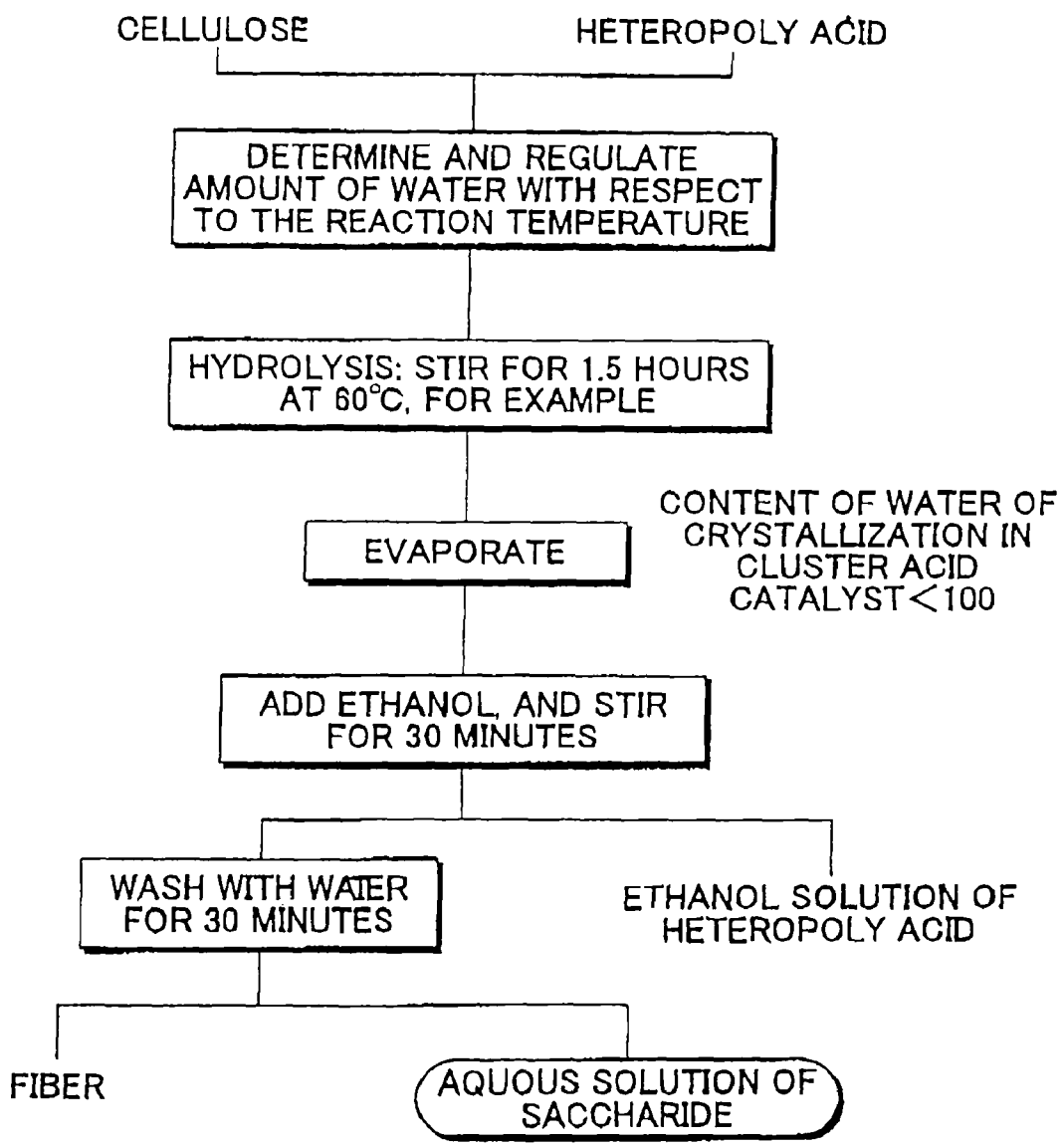
FIG. 5 is a chart for describing steps from hydrolysis of cellulose to collection of saccharide and heteropoly acid in Example 9.

An experiment was conducted according to a chart shown in FIG. 5. Specifically, in a way similar to that used in Example 6, a mixture was prepared by stirring cellulose, phosphotungstic acid and distilled water in a closed container at 60° C. for 1.5 hours. Thereafter, the closed container was opened with the temperature being maintained at 60° C. to drive off the water in the container. The temperature was maintained at 60° C. for a while even after liquid in the container was solidified, and then heating was stopped. Thereafter, in a way similar to that used in Example 6, phosphotungstic acid was collected, and the produced saccharide and the unreacted cellulose were separated. The conversion R was 67%, and the yield η of glucose was 67%. That is, almost 100% of the produced glucose was collected.

This result shows that it is possible to prevent glucose from being dissolved in the water that is not coordinated to phosphotungstic acid and mixed into ethanol and thus improve the yield of glucose, by removing the water in the reaction system to reduce the amount of water of crystallization contained in the phosphotungstic acid below the normal water-of-crystallization amount before the step of separating the phosphotungstic acid from saccharide and fiber by adding ethanol.

Example 10

In a way similar to that used in Example 4, a mixture was prepared by stirring cellulose, phosphotungstic acid and distilled water in a closed container at 60° C. for 1.5 hours. Thereafter, a predetermined amount (3 liters) of ethanol was added with the temperature being maintained at 60° C., and the mixture was stirred for 30 minutes. Subsequently, the temperature was decreased to around room temperature and a desiccant agent (anhydrous calcium chloride particles) packed in a bag was added to remove water in the container. Glucose powder was precipitated, and phosphotungstic acid was kept dissolved in ethanol. In a way similar to that used in Example 6, phosphotungstic acid and saccharide were separated. The conversion R was 67%, and the yield of glucose was 67%. Almost 100% of the produced glucose was collected.

As in the case of the above-described Example 9, this result shows that it is possible to prevent glucose from being dissolved in the water that is not coordinated to phosphotungstic acid and mixed into ethanol and thus improve the yield of glucose, by removing the water in the reaction system to reduce the amount of water of crystallization contained in the phosphotungstic acid below the normal water-of-crystallization amount before the step of separating the phosphotungstic acid from saccharide and fiber by adding ethanol. The water in the reaction system was evaporated using the afterheat due to the hydrolysis of cellulose in the above-described Example 9, whereas the amount of water in the reaction system was regulated by adding a desiccant agent and allowing the desiccant agent to absorb water in Example 10.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A plant-fiber-material transformation method comprising:
   hydrolyzing cellulose contained in a plant fiber material using a pseudo molten cluster acid catalyst, suh that a hyrolysis reaction system is made, wherein the hydrolyzing produces saccharide, most of which is glucose,
   wherein in the hydrolysis of the cellulose, the pseudo-molten cluster acid is in an amount such that no reaction solvent other than the pseudo-molten cluster acid is needed to make the hydrolysis reaction system to be in a fluid state.

2. The plant-fiber-material transformation method according to claim 1, wherein the hydrolysis of the cellulose is performed at or below 140° C. under a pressure condition of an atmospheric pressure to 1 MPa.

3. The plant-fiber-material transformation method according to claim 2, wherein the hydrolysis of the cellulose is performed at or below 120° C.

4. The plant-fiber-material transformation method according to claim 3, wherein the hydrolysis of the cellulose is performed at or below 100° C.

5. The plant-fiber-material transformation method according to claim 1, wherein a weight ratio between the plant fiber material and the cluster acid is within a range of 1:1 to 1:4.

6. The plant-fiber-material transformation method according to claim 1, wherein an amount of water in the hydrolysis reaction system is equal to or greater than a sum of i) an amount of water of crystallization required to bring all the cluster acid in the hydrolysis reaction system into a pseudo-molten state at a temperature condition for the hydrolysis, and ii) an amount of water required to hydrolyze all the cellulose in the hydrolysis reaction system into glucose.

7. The plant-fiber-material transformation method according to claim 1, wherein the cluster acid is heteropoly acid.

8. The plant-fiber-material transformation method according to claim 7, wherein the heteropoly acid is one selected from a group consisting of phosphotungstic acid, silicotungstic acid, and phosphomolybdic acid.

9. The plant-fiber-material transformation method according to claim 7, wherein the heteropoly acid has a Keggin structure.

10. The plant-fiber-material transformation method according to claim 7, wherein the heteropoly acid has a Dawson structure.

11. The plant-fiber-material transformation method according to claim 1, further comprising:

precipitating the saccharide with the use of an organic solvent after producing the glucose; and separating the saccharide including the solidified saccharide during the hydrolysis and the precipitated saccharide from residues and the cluster acid.

12. The plant-fiber-material transformation method according to claim 11, wherein a solubility of the saccharide with respect to the organic solvent is equal to or less than 0.6 g/100 ml.

13. The plant-fiber-material transformation method according to claim 12, wherein the solubility of the saccharide with respect to the organic solvent is equal to or less than 0.06 g/100 ml.

14. The plant-fiber-material transformation method according to claim 12, wherein a solubility of the cluster acid with respect to the organic solvent is equal to or greater than 20 g/100 ml.

15. The plant-fiber-material transformation method according to claim 14, wherein the solubility of the cluster acid with respect to the organic solvent is equal to or greater than 40 g/100 ml.

16. The plant-fiber-material transformation method according to claim 11, wherein at least one selected from ether solvents and alcohol solvents is used as the organic solvent.

17. The plant-fiber-material transformation method according to claim 16, wherein the organic solvent is ethanol.

18. The plant-fiber-material transformation method according to claim 16, wherein the organic solvent is diethyl ether.

19. The plant-fiber-material transformation method according to claim 11, wherein an amount of water in a saccharide-separating reaction system is controlled so that all the cluster acid in the saccharide-separating reaction system contains water of crystallization whose amount is equal to or less than a normal water-of-crystallization amount.

20. The plant-fiber-material transformation method according to claim 11, wherein after the saccharide is separated, the cluster acid is dehydrated so that all the cluster acid in the organic solvent contains water of crystallization whose amount is equal to or less than a normal water-of-crystallization amount.

21. The plant-fiber-material transformation method according to claim 20, wherein a cluster acid containing water of crystallization whose amount is equal to or less than the normal water-of-crystallization amount is used as a desiccant agent to dehydrate the cluster acid.

22. The plant-fiber-material transformation method according to claim 21, wherein a content rate of water of crystallization of the cluster acid as the desiccant agent is equal to or less than 70%.

23. The plant-fiber-material transformation method according to claim 22, wherein the content rate of water of crystallization of the cluster acid as the desiccant agent is equal to or less than 30%.

24. The plant-fiber-material transformation method according to claim 11, further comprising separating the cluster acid dissolved in the organic solvent from the organic solvent.

25. The plant-fiber-material transformation method according to claim 24, wherein the separated cluster acid from the organic solvent is reused as the catalyst for hydrolysis of cellulose contained in plant fiber material.

26. The plant-fiber-material transformation method according to claim 1, wherein the plant fiber material is cellulose-based biomass.

* * * * *